(12) United States Patent
Nakata

(10) Patent No.: US 9,990,732 B2
(45) Date of Patent: Jun. 5, 2018

(54) ENTITY RECOGNITION SYSTEM

(71) Applicant: DENSO CORPORATION, Kariya, Aichi-pref. (JP)

(72) Inventor: Tsuneo Nakata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 119 days.

(21) Appl. No.: 15/147,931

(22) Filed: May 6, 2016

(65) Prior Publication Data

US 2016/0335509 A1 Nov. 17, 2016

(30) Foreign Application Priority Data

May 11, 2015 (JP) .................................. 2015-96491

(51) Int. Cl.
| | |
|---|---|
| G06K 9/00 | (2006.01) |
| G06K 9/62 | (2006.01) |
| G06T 7/00 | (2017.01) |
| G06T 7/20 | (2017.01) |
| H04L 29/08 | (2006.01) |
| G08G 1/005 | (2006.01) |
| G08G 1/01 | (2006.01) |
| G08G 1/017 | (2006.01) |

(Continued)

(52) U.S. Cl.
CPC ............ *G06T 7/20* (2013.01); *G06K 9/00335* (2013.01); *G08G 1/005* (2013.01); *G08G 1/0112* (2013.01); *G08G 1/0129* (2013.01); *G08G 1/0133* (2013.01); *G08G 1/0175* (2013.01); *G08G 1/04* (2013.01); *G08G 1/164* (2013.01)

(58) Field of Classification Search
CPC .. H04L 67/12; G06T 7/20; G06T 7/70; G06T 2207/30241; G06T 2207/30252; G06K 9/00335; G08G 1/005; G08G 1/0112; G08G 1/0129; G08G 1/0133; G08G 1/0175; G08G 1/04; G08G 1/164

See application file for complete search history.

(56) References Cited

U.S. PATENT DOCUMENTS

| | | | | |
|---|---|---|---|---|
| 2011/0268423 | A1* | 11/2011 | Ge .......................... | H04N 5/232 386/244 |
| 2015/0341599 | A1* | 11/2015 | Carey .................... | H04N 7/181 348/150 |
| 2016/0202065 | A1* | 7/2016 | Chen .................. | G06K 9/00335 382/103 |

FOREIGN PATENT DOCUMENTS

JP 3927168 B2 6/2007

* cited by examiner

*Primary Examiner* — Jon Chang
(74) *Attorney, Agent, or Firm* — Harness, Dickey & Pierce, P.L.C.

(57) ABSTRACT

A first terminal accompanying a subject moving entity transmits a first time-sequential data string, which represents a history of a first state quantity varying depending on a behavior of the subject moving entity, to a second terminal wirelessly. The second terminal stores a second time-sequential data string representing a history of a second state quantity of a moving entity detected by a moving entity detector in association with the moving entity detected. The received first time-sequential data string and the stored second time-sequential data string are referred to so as to identify the association between (i) the first terminal, which is equivalent to a transmission source of the first time-sequential data string, and (ii) an identified moving entity that is identified from the detected moving entity, to determine that the identified moving entity is associated with the first terminal.

10 Claims, 7 Drawing Sheets

(51) Int. Cl.
*G08G 1/04* (2006.01)
*G08G 1/16* (2006.01)

| TIME | ACCELERATION | ROTATIONAL/ ANGULAR VELOCITY | AZIMUTH | ID |
|---|---|---|---|---|
| T1 | (Ax1, Ay1, Az1) | (Gp1, Gr1, Gy1) | (Ha1, Hb1, Hc1) | k |
| T2 | (Ax2, Ay2, Az2) | (Gp2, Gr2, Gy2) | (Ha2, Hb2, Hc2) | K+1 |
| T3 | (Ax3, Ay3, Az3) | (Gp3, Gr3, Gy3) | (Ha3, Hb3, Hc3) | K+2 |
| ... | ... | ... | ... | |

ENTITY RECOGNITION SYSTEM

CROSS REFERENCE TO RELATED APPLICATION

The present application is based on Japanese Patent Application No. 2015-96491 filed on May 11, 2015, the disclosure of which is incorporated herein by reference.

TECHNICAL FIELD

The present disclosure relates to an entity recognition system that associates an entity, which is recognized by a computer system using an apparatus such as a camera to recognize an environment within a predetermined range, with a moving entity carrying or mounted with a terminal communicating with the computer system.

BACKGROUND ART

Patent Literature 1: JP 3927168 B2

Patent Literature 1 discloses an entity recognition system including a camera that images a predetermined range, an accessory element that accompanies an entity in the real world, and a computer that wirelessly communicates with the accessory element and acquires a photographic image of the camera.

The accessory element in Patent Literature 1 emits light in responding to a light emission instruction command issued from the computer. The computer sequentially analyzes the photographic image of the camera, so as to detect the light emitted from the accessory element. The computer identifies the position of the entity accompanied by the accessory element, based on the position of emitted light in the photographic image. Accordingly, the computer identifies the association of the entity imaged using the camera, with the entity, which exists in the real world and is accompanied by the accessory element that wirelessly communicates with the computer.

SUMMARY

There have been demanded lately services detecting moving entities such as pedestrians, lightweight vehicles, and bicycles present in a predetermined detection area, the services providing the detected moving entities with various information dependent on the positions, behaviors, or ambient situations of the moving entities. Examples include (i) a service of specifying position information on the moving entities present in the detection area to provide the specified position information to the moving entities, and (ii) a service of detecting moving entities possibly colliding with each other, based on the positional relationship therebetween to notify the moving entities of the possibility of the collision.

To provide such a service, a moving entity carrying or mounted with a terminal communicating with a computer needs to be associated with a moving entity detected by the computer using a camera.

To render the above service, the technology in Patent Literature 1 may be employed to permit the computer to identify the association of a visually detected moving entity with the terminal. The configuration in Patent Literature 1, however, fails to identify the association between (i) a real entity accompanied by an accessory element and (ii) an imaged entity captured using the camera, unless the real entity maintains its position and posture in an appropriate state enabling the camera to capture a light emitting part of the accessory element. Even when an accessory element is attached to each of various moving entities, the computer may thus fail to identify the association depending on postures taken by a target of detection (i.e., a target of image capture).

An object of the present disclosure is to provide an entity recognition system that identifies an association between (i) a communication terminal, which is retained in a moving entity, and (ii) a moving entity detected by a computer. The entity recognition system reduces a possibility of failing to identify such association depending on a posture taken by the moving entity.

According to a first example of the present disclosure, an entity recognition system is provided to include a first terminal carried by or mounted to a subject moving entity, and a second terminal separated from the first terminal to wirelessly communicate with the first terminal. The first terminal includes (i) a state quantity acquirer that acquires a predetermined first state quantity that varies depending on a behavior of the subject moving entity, (ii) a first state quantity history memory that stores a first time-sequential data string that represents a history of the first state quantity, and (iii) an in-first-terminal communicator that communicates with the second terminal to transmit the first time-sequential data string stored in the first state quantity history memory, to the second terminal. The second terminal includes (i) an in-second-terminal communicator that communicates with the first terminal to acquire at least the first time-sequential data string from the first terminal, (ii) a detection data acquirer that acquires detection data used to detect an entity present in a predetermined detection area, (iii) a moving entity detector that detects at least one moving entity that is present in the detection area by analyzing the detection data, (iv) a state quantity estimator that estimates a predetermined second state quantity concerning a behavior of a detected moving entity that is the at least one moving entity detected by the moving entity detector, based on the detection data, (v) a second state quantity history memory that stores a second time-sequential data string in association with the detected moving entity, the second time-sequential data string representing a history of the second state quantity of the detected moving entity, and (vi) an association identifier identifying an association between the first terminal, which is equivalent to a transmission source of the first time-sequential data string, and an identified moving entity that is identified from the detected moving entity, to determine that the identified moving entity is associated with the first terminal, based on the first time-sequential data string received by the in-second-terminal communicator and the second time-sequential data string stored in the second state quantity history memory.

According to such configuration, an association identifier of a second terminal identifies association of a moving entity, which carries or is mounted with a target-of-identification terminal, with a moving entity, which exists in a detection area, based on the first time-sequential data string sent from a first terminal (target-of-identification terminal) and the second time-sequential data string of the detected moving entity which the second terminal estimates. Namely, the association identifier can identify the detected moving entity that is associated with the target-of-identification terminal, from among the various moving entities that have been detected.

In the aforesaid configuration, to associate the detected moving entity with the target-of-identification terminal, the first time-sequential data string sent from the target-of-identification terminal need be received by the second terminal. In general, a wireless communication signal propagates not only in a radiating direction but also in various directions due to reflection and diffraction. This relatively reduces the possibility of the second terminal failing to receive the first time-sequential data string sent from the first terminal because of the change or fluctuation in the posture of the moving entity associated with the first terminal.

Therefore, compared with the configuration in Patent Literature 1, the aforesaid configuration can reduce a fear that the second terminal may fail to associate the detected moving entity with the first terminal because of the posture of the moving entity.

According to a second example of the present disclosure, an entity recognition system is provided to include a plurality of first terminals that are respectively carried by subject moving entities or mounted to the subject moving entities, and a second terminal separated from the plurality of first terminals to wirelessly communicate with each of the plurality of first terminals. A subject first terminal that is any one of the plurality of first terminals includes (i) a state quantity acquirer that acquires a predetermined first state quantity which varies depending on a behavior of the corresponding subject moving entity, (ii) a first state quantity history memory that stores a first time-sequential data string representing a history of the first state quantity, and (iii) an in-first-terminal communicator that communicates with the second terminal. The second terminal includes (i) an in-second-terminal communicator that communicates with each of the plurality of first terminals, (ii) a detection data acquirer that acquires detection data used to detect an entity present in a predetermined detection area, (iii) a moving entity detector that detects at least one moving entity present in the detection area by analyzing the detection data, (iv) a state quantity estimator that estimates a second state quantity of a detected moving entity that is the at least one moving entity detected by the moving entity detector, based on the detection data acquired by the detection data acquirer, (v) a second state quantity history memory that stores a second time-sequential data string in association with the detected moving entity, the second time-sequential data string representing a history of the second state quantity of the detected moving entity, and (vi) a situation determiner that determines based on the second state quantity of the detected moving entity stored in the second state quantity history memory, whether an identified moving entity that is included in the detected moving entity present in the detection area has entered a predefined warning needed situation. The in-second-terminal communicator transmits the second time-sequential data string to the plurality of first terminals, the second time-sequential data string being associated with the identified moving entity that is determined to have entered the warning needed situation by the situation determiner, whereas the in-first-terminal communicator of each of the plurality of first terminals receives the second time-sequential data string from the second terminal. The subject first terminal that is any one of the plurality of first terminals further includes (i) an in-first-terminal association determiner that compares the second time-sequential data string received by the in-first-terminal communicator, with the first time-sequential data string stored in the first state quantity history memory to determine whether the identified moving entity associated with the received second time-sequential data string is the corresponding subject moving entity which carries the subject first terminal or to which the subject first terminal is mounted, and (ii) a warning processor that warns a user when the in-first-terminal association determiner determines that the identified moving entity associated with the received second time-sequential data string is the corresponding subject moving entity which carries the subject first terminal or to which the subject first terminal is mounted.

According to the aforesaid configuration, a state quantity estimator of the second terminal sequentially estimates a state quantity of each of moving entities existent in the detection area (that is, detected moving entities). A situation determiner determines based on the state quantity of each of the detected moving entities, which is estimated by the state quantity estimator, whether each of the moving entities existent in the detection area has entered a warning needed situation. If any moving entity has entered the warning needed situation, the second time-sequential data string representing a history of the state quantity estimated for the moving entity is distributed to each of first terminals.

A state quantity acquirer included in each of the first terminals sequentially acquires the same kind (i.e., identical kind) of state quantity as that of state quantity estimated by the second terminal. The history of the state quantity acquired at a plurality of time points is stored as the first time-sequential data string in a first state quantity history memory. On receipt of the second time-sequential data string from the second terminal, an association determiner of each of the first terminals compares the first time-sequential data string with the second time-sequential data string so as to determine whether the moving entity which carries the first terminal itself (own terminal) or in which the own terminal is mounted is the moving entity associated with the second time-sequential data string.

According to the aforesaid configuration, the first terminal merely needs to receive the second time-sequential data string sent from the second terminal for the purpose of identifying the association of the moving entity, which is determined to have entered the warning needed situation by the second terminal, with the own terminal. This can reduce a possibility that the first terminal may fail to associate a moving entity, which is recognized as having entered the warning needed situation by the second terminal, with the moving entity, which carries the own terminal or in which the own terminal is mounted, because of the posture of the moving entity which carried the first terminal or in which the first terminal is mounted.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
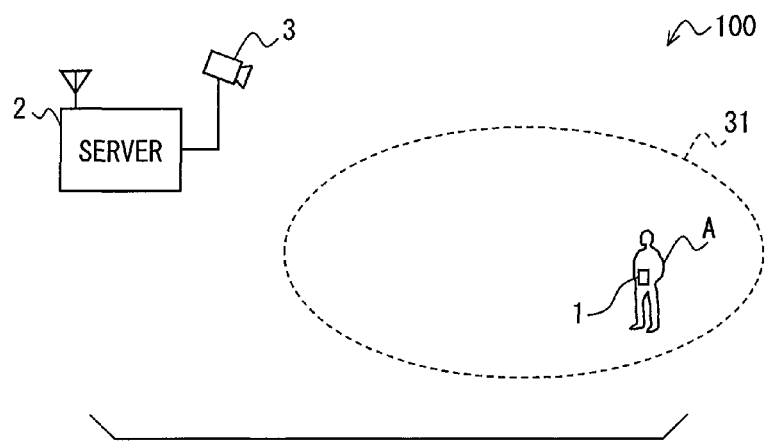
FIG. 1 is a conceptual diagram illustrating a schematic configuration of an entity recognition system in accordance with the present disclosure.

Referring to the drawings, embodiments and modifications of the present disclosure will be described below. Hereinafter, identical reference signs will be assigned to members having the same capabilities as components of a previously described embodiment, and an iterative description will be omitted. When part of components is described, the other part of the components can be understood by referencing a previously described embodiment or modification.

First Embodiment

A first embodiment of the present disclosure will be described in conjunction with the drawings. FIG. 1 is a diagram illustrating an example of a schematic configuration of an entity recognition system 100 in accordance with the present embodiment. The entity recognition system 100 in accordance with the present embodiment includes (i) a portable terminal 1 that is carried by each of users (for example, user A), (ii) a server 2, and (iii) a camera 3 that sequentially images a predefined range (an imaging range) 31. The entity recognition system 100 that recognizes an entity or a moving entity may be also referred to as an object recognition system that recognizes an object or a moving object. The camera 3 may be referred to an entity detection apparatus.

The portable terminal 1 may be a known smartphone, tablet terminal, wearable device, handheld game machine, or handheld music player. The portable terminal 1 is premised to be installed with an application program for acting as a communication terminal included in the entity recognition system 100.

The portable terminal 1 and server 2 are designed to perform wireless communication (wide-area communication) over a wide-area communication network such as a telephone network or the Internet. The server 2 and camera 3 are connected to each other over a local area network (LAN). A video signal produced by the camera 3 is sequentially outputted to the server 2. The server 2 and camera 3 may be connected to each other so that they can communicate with each other over a wide-area network.

In the present embodiment, the portable terminal 1 that is carried by a user is included as a communication terminal in the entity recognition system 100. However, the present disclosure is not limited to the portable terminal. The communication terminal included in the entity recognition system 100 may be a communication terminal employed in various moving entities such as pedestrian or vehicle (e.g., lightweight vehicle, motorized bicycle, automobile, trolley bus, and tramcar).

For example, the communication terminal in the entity recognition system 100 may be a communication terminal (onboard terminal or in-vehicle terminal) mounted in an automobile. In this mode, the onboard terminal has the same features as the portable terminal 1 to be described below. The portable terminal 1 or onboard terminal is equivalent to a first terminal; the server 2 is equivalent to a second terminal.

FIG. 1 illustrates only one portable terminal 1. The entity recognition system 100 includes (i) a plurality of portable terminals 1 that are carried by respective users and/or (ii) onboard terminals mounted in respective vehicles. An inherent identifier (terminal ID) is assigned to each of communication terminals. Based on the terminal ID, the server 2 or communication terminals can discriminate a communicational party.

<Configuration of Portable Terminal 1>

The schematic configuration of the portable terminal 1 will be described below in conjunction with FIG. 2. As in FIG. 2, the portable terminal 1 includes an in-portable controller 11, acceleration sensor 12, gyro-sensor 13, terrestrial magnetism sensor 14, and in-portable communicator 15. Out of components relevant to various features included by a typical portable terminal such as a smartphone, those that are unnecessary to describe the present embodiment are omitted.

The in-portable controller 11 is formed as an ordinary computer and includes a CPU, memory, storage, I/O port, and bus over which these components are interconnected. The storage stores (i) software such as the application program and (ii) a terminal ID assigned to the portable terminal 1.

The in-portable controller 11 fills the role of controlling the operation of the entire portable terminal 1. The in-portable controller 11 sequentially acquires data items (i.e., a time-sequential data string) outputted from the acceleration sensor 12, gyro-sensor 13, and terrestrial magnetism sensor 14 respectively. The in-portable controller 11 can communicate with the in-portable communicator 15. The features or functions of the in-portable controller 11 will be described later.

The acceleration sensor 12 is a sensor that detects an acceleration which reacts on the portable terminal 1 along with the behavior of a user who carries the portable terminal 1. The acceleration sensor 12 is a triaxial acceleration sensor that detects accelerations in the directions of three axes (X, Y, and Z axes) that are orthogonal to one another. The results of detection by the acceleration sensor 12 are sequentially fed to the in-portable controller 11. The acceleration sensor 12 may be a biaxial sensor.

The gyro-sensor 13 is a triaxial gyro-sensor that detects rotational/angular velocities about three axes (pitch axis, roll axis, and yaw axis) that are orthogonal to one another. The results of detection by the gyro-sensor 13 are sequentially fed to the in-portable controller 11. The gyro-sensor 13 may be a biaxial gyro-sensor.

The terrestrial magnetism sensor 14 measures the orientation of a magnetic field and detects an azimuth in which the portable terminal 1 is oriented. The terrestrial magnetism sensor 14 is a triaxial terrestrial magnetism sensor that decomposes terrestrial magnetism into components in three axial directions that are orthogonal to one another, and detects (or estimates) the components. The results of detection by the terrestrial magnetism sensor 14 are sequentially fed to the in-portable controller 11. The terrestrial magnetism sensor 14 may be a biaxial terrestrial magnetism sensor.

Herein, the acceleration sensor 12 and gyro-sensor 13 are shown with different block graphics. The acceleration sensor 12 and gyro-sensor 13 may be included as one hexa-axial sensor (so-called motion sensor) obtained by combining the triaxial acceleration sensor and triaxial gyro-sensor. The motion sensor is a sensor that detects (i.e., calculates or estimates) various state quantities that vary along with the behavior of the portable terminal 1.

The portable terminal 1 need not include all of the acceleration sensor 12, gyro-sensor 13, and terrestrial magnetism sensor 14. The portable terminal 1 may include sensors other than these sensors.

The in-portable communicator 15 is connected onto a wide-area communication network, demodulates a signal received over the wide-area communication network, and feeds the resultant signal to the in-portable controller 11. The in-portable communicator 15 modulates a baseband signal inputted from the in-portable controller 11, and transmits the resultant signal to the server 2. Namely, the in-portable communicator 15 transmits or receives data to or from the server 2. The in-portable communicator 15 is equivalent to an in-first-terminal communication portion or an in-first-terminal communicator.

Figure 2:
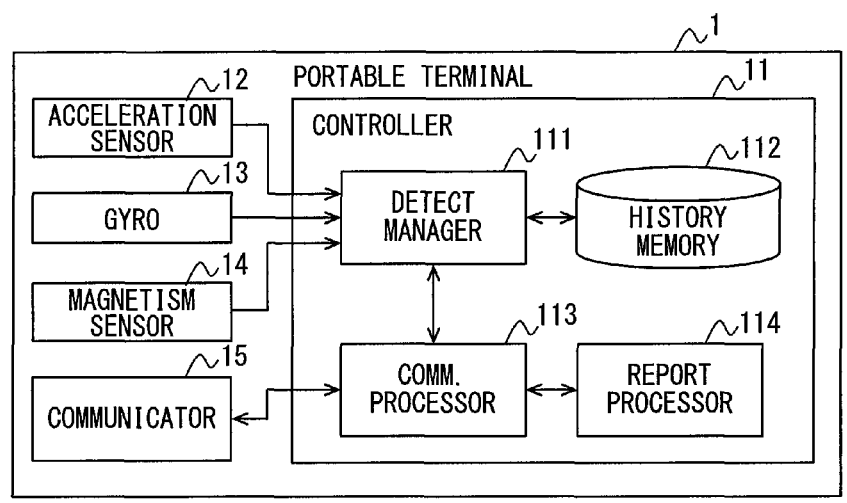
FIG. 2 is a block diagram illustrating a schematic configuration of a portable terminal in a first embodiment.

The in-portable controller 11 includes, as in FIG. 2, as functional blocks that are realized by running the aforesaid software, a detection manager 111, history memory 112, in-portable communication processor 113, and reporting processor 114. Each of the detection manager 111, in-portable communication processor 113, and reporting processor 114 may be realized by hardware with at least one IC. The history memory 112 may be realized by utilizing part of a memory included in the in-portable controller 11. The history memory 112 is equivalent to a first state quantity history storage portion or a first state quantity history memory.

The detection manager 111 sequentially acquires results of detections provided by various sensors. More particularly, the detection manager 111 sequentially acquires the accelerations (Ax, Ay, and Az) in three axial directions, the rotational/angular velocities (Gp, Gr, and Gy) about three axes, and the three axial-direction components (Ha, Hb, and Hc) of terrestrial magnetism indicating an azimuth. Ax denotes the acceleration in the X-axis direction, Ay denotes the acceleration in the Y-axis direction, and Az denotes the acceleration in the Z-axis direction. Gp denotes the rotational/angular velocity about the pitch axis, Gr denotes the rotational/angular velocity about the roll axis, and Gy denotes the rotational/angular velocity about the yaw axis. Ha, Hb, and Hc denotes the magnitudes of terrestrial magnetism in three axial directions that are orthogonal to one another. The detection manager 111 is equivalent to a state quantity acquisition portion or a state quantity acquirer.

Figures 3, 4:
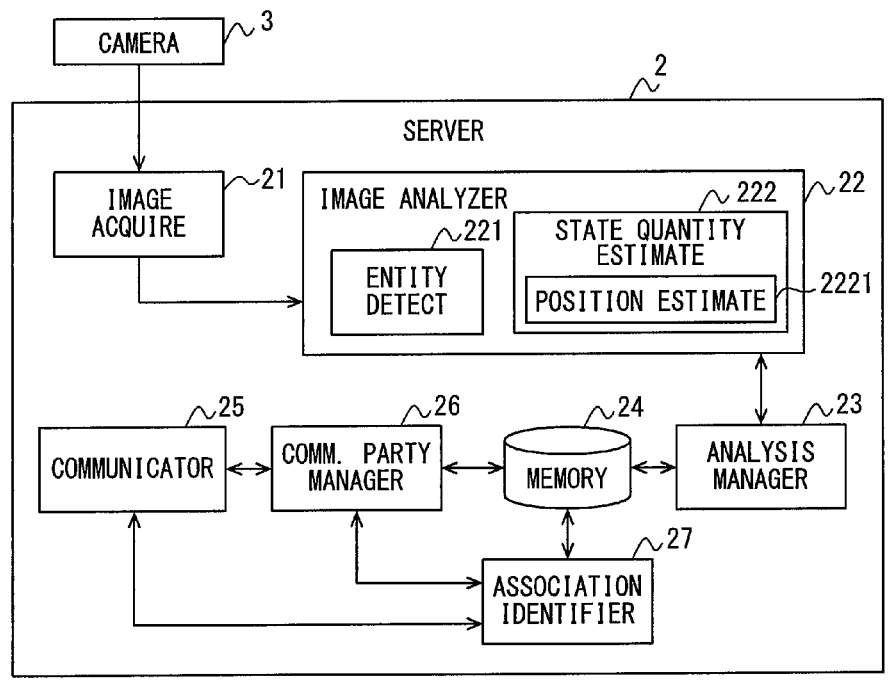
FIG. 3 is a diagram for explaining a schematic structure of data stored in a history memory.
FIG. 4 is a block diagram illustrating an example of a schematic configuration of a server in the first embodiment.

The acquired results of detections are preserved in the history memory 112 in association with an acquisition time (not equal to a detection time). FIG. 3 is a diagram illustrating an example of a data structure of data items stored in the history memory 112. Various state quantities at each of time points are preserved in association with a sample ID in addition to time information representing the time at which the state quantities are detected. The sample ID is an identification number with which results of detections at a certain time are discriminated from results of detections at another time. As the sample IDs, serial numbers are assigned in ascending order of the detection time. In the history memory 112, the results of detections at a plurality of time points are time-sequentially sorted and stored, as a data string, so that the newest ones come first. It is noted, in the present embodiment, "information" may be used to be not only uncountable but also countable; information items may be represented as informations.

Accelerations, rotational/angular velocities, and the azimuth of the portable terminal 1 are equivalent to an example of various state quantities of the portable terminal 1 that vary depending on a user's behavior. Based on the various state quantities acquired from various sensors, the detection manager 111 may estimate, for example, the moving direction of the portable terminal 1, a distance of movement, a moving velocity, and a change quantity in the posture, and may preserve them in association with time information.

A method of obtaining the distance of movement, moving velocity, and posture of the portable terminal 1 based on the accelerations, rotational/angular velocities, and azimuth is already known. A detailed description will therefore be omitted. The moving direction, distance of movement, moving velocity, change quantity in the posture, and posture of the portable terminal 1 which are estimated using various sensors are equivalent to state quantities.

Further, the detection manager 111 may estimate a relative position with respect to an origin, which is a certain position at a calculation beginning time point, based on various state quantities acquired from various sensors, and may preserve the relative position in association with time information in the history memory 112. The calculation beginning time point may be a predetermined cyclic time point or a time point at which a predetermined trigger signal is externally inputted. Otherwise, the calculation beginning time point may be a time point at which a user performs a predetermined manipulation.

The in-portable communication processor 113 controls the action of the in-portable communicator 15, and allows the in-portable communicator 15 to acquire data that is sent from the server 2 and received by the in-portable communicator 15, or to transmit data to the server 2. For example, when detecting a predetermined trigger, the in-portable communication processor 113 accesses the history memory 112, and extracts data in which results of detections, which are performed during a certain period of time, out of the latest results of detections are arrayed time-sequentially as a data string. The in-portable communication processor 113 collaborates with the in-portable communicator 15 to transmit the data as terminal behavior data to the server 2. The terminal behavior data is data representing a history of a behavior of a user, who carries the portable terminal 1, observed during a certain period of time since a current time point. The terminal behavior data is equivalent to a first time-sequential data string. What is referred to as the behavior is a movement, jump, change in a posture, or shake.

The in-portable communication processor 113 may transmit terminal behavior data at intervals of a certain time or transmit the terminal behavior data when accepting a predetermined manipulative entry made by a user.

Further, when the portable terminal 1 includes an area inside/outside determination portion 115 that will be described later, only if the area inside/outside determination portion 115 determines that the portable terminal 1 exists within the imaging range 31, terminal behavior data may be transmitted at regular intervals. As mentioned previously, data sent from the portable terminal 1 to the server 2 contains a terminal ID which indicates the portable terminal 1 serving as a transmission source.

The reporting processor 114 reports a variety of information to a user via a notifying unit such as a display, loudspeaker, or vibrator (unshown) included in the portable terminal 1.

<Configuration of Server 2>

Next, the configuration of the server 2 will be described below. As in FIG. 4, the server 2 includes as functional blocks an image acquisition portion 21, image analyzer 22, analysis manager 23, in-server memory 24, in-server communicator 25, communicational party manager 26, and association identifier 27.

The functional blocks of the server 2 other than the in-server memory 24 may be realized by software or by hardware with at least one IC. The in-server memory 24 is realized with a rewritable storage medium. The in-server memory 24 is used as a database storing various data items. The server 2 may be realized by utilizing a known cloud computing technology.

The image acquisition portion 21 sequentially acquires a video signal produced by the camera 3. By performing predetermined encoding processing on an acquired video signal, each of frame data items carried by the video signal is converted into data (image data) that is formatted to undergo known image analysis processing. Image data corresponding to each of frames and being produced from the video signal is sequentially fed to the image analyzer 22. The image data is, as mentioned later, used to detect a moving entity (also referred to as a moving object) existent within the imaging range 31. Namely, the image data acquired by the image acquisition portion 21 is equivalent to an example of detection data, and the imaging range 31 is equivalent to a detection area. The image acquisition portion 21 is equivalent to a detection data acquisition portion or a detection data acquirer.

The image analyzer 22 is a functional block that analyzes image data fed from the image acquisition portion 21. The image analyzer 22 includes, as finer functional blocks, a moving entity detection block 221 and a state quantity estimation block 222.

The moving entity detection block 221, which may be also referred to as a moving entity detection portion, or a moving entity detector, analyzes image data that is sequentially inputted from the image acquisition portion 21, and detects a moving entity that is pre-designated as a target of detection. As a method of extracting a predetermined target of detection from image data, a known image recognition processing technique such as pattern matching or Hough transformation may be adopted.

For example, the image analyzer 22 performs known image processing such as edge detection on image data so as to extract contours of all entities shown in an image. Pattern matching processing is then performed on the image data, which has undergone the image processing, to detect a moving entity that is a target of detection. As the image processing, aside from the edge detection, mirror image conversion for converting an image into a mirror image or distortion correction for correcting a distortion occurring on the perimeter of an image because of the property of a lens may be carried out.

A moving entity that is a target of detection in the present embodiment is a pedestrian, or a vehicle such as lightweight vehicle (including the driver), or automobile. Data (image recognition data) to be employed in image recognition processing for detecting the moving entities, which are targets of detection, from image data may be stored in a storage medium (unshown). The image recognition data is comparable with data representing a shape pattern of a moving entity that is a target of detection.

When detecting a moving entity, which is a target of detection, in image data, the moving entity detection block 221 assigns a moving entity ID, which serves as a management number for use in discriminating the moving entity from the others, to the detected moving entity. The moving entity ID may be a number that differs among moving entities in image data (existent within the imaging range 31), or may be a number to be designated in order of detection.

A moving entity that has been detected once is tracked using a known entity tracking technique. Accordingly, one moving entity ID is assigned to the same moving entity. For convenience' sake, a moving entity to which the moving entity ID has already been assigned may be referred to as a detected moving entity.

The state quantity estimation block 222, which may be also referred to as a state quantity estimation portion or a state quantity estimator, tracks a moving entity, which is detected by the moving entity detection block 221, so as to estimate various state quantities, which signify a behavior of the moving entity, for each of moving entities caught or captured by the camera 3. Herein, the state quantities are comparable with or include an absolute position spatially relative position, temporally relative position, moving velocity, moving direction, moving trajectory, and change quantity in a posture (change angle in an orientation).

The absolute position is a position represented by a latitude and longitude, and the spatially relative position is a relative position with respect to a point (for example, the center of the imaging range 31) regarded as a reference within the imaging range 3. The temporally relative position is a relative position at a current time point with respect to the position of a moving entity at a certain time point (for example, a time point at which tracking is begun) regarded as a reference.

For example, the absolute position may be calculated based on the position of a moving entity in image data, a setting position of the camera 3, and an imaging direction. Alternatively, coordinate transformation data representing association of coordinates in image data with coordinates (latitude and longitude) of each of points within the imaging range 31 may be prepared, and the absolute position of a moving entity may be estimated based on the coordinate transformation data and the position of the moving entity in image data.

The spatially relative position or temporally relative position can be obtained by, for example, sequentially calculating the absolute position of a moving entity and comparing the absolute position with the coordinates of a point regarded as a reference. The moving trajectory may be a time-sequential data string of absolute positions obtained up to the current time point since a time point at which tracking is begun. The moving velocity and moving direction of a moving entity can be calculated based on a change quantity in the position of the moving entity over consecutive frames.

The state quantity estimation block 222 may estimate an acceleration, which reacts on a moving entity, by obtaining a time derivative of the moving velocity of a moving entity, or may estimate a rotational/angular velocity about an axis perpendicular to a road surface by obtaining a time derivative of a change quantity per unit time in a moving direction (i.e., a change quantity in an orientation). That is, the state quantity estimation block 222 may estimate as a state quantity of a certain moving entity an acceleration, a change quantity in an orientation of a moving entity, or a rotational/angular velocity aside from an absolute position, spatially relative position, temporally relative position, moving velocity, moving direction, or moving trajectory.

The state quantity estimation block 222 need not estimate all of the state quantities but may estimate any of the state quantities listed above. The state quantity estimation block may estimate a state quantity other than the listed ones.

In the present embodiment, the state quantity estimation block 222 is enabled to estimate an absolute position of a moving entity, eventually. As a functional block for estimating the absolute position, the state quantity estimation block 222 includes a position estimation block 2221, which may be also referred to as a position estimation portion or a position estimator. Various state quantities (that is, results of estimation) of each of moving entities used for the estimation by the state quantity estimation block 222 are fed to the analysis manager 23 in association with a moving entity ID.

In the present embodiment, the state quantity estimation block 222 estimates the state quantities of a moving entity for each frame. Alternatively, the state quantity estimation block 222 may estimate the state quantities at intervals of a certain time such as 3 frames or 10 frames.

The analysis manager 23 manages information on a moving entity, which is caught by the camera 3, fed from the image analyzer 22. More particularly, state quantities estimated for a moving entity, to which a moving entity ID is assigned, by the state quantity estimation block 222 are stored in the in-server memory 24 in association with the moving entity ID.

Figure 5:
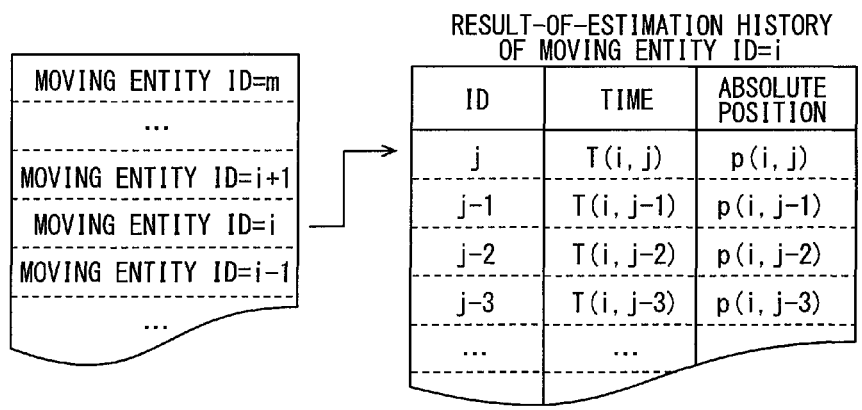
FIG. 5 is a conceptual diagram for explaining a schematic structure of data stored in an in-server memory.

For example, the analysis manager 23 manages moving entities, which exist within the imaging range 31, using a moving entity list that lists the moving entities. FIG. 5 is a diagram illustrating an example of a data structure expressing information on moving entities stored in the memory. As in FIG. 5, information on each moving entity is discriminated from the others with a moving entity ID. Various state quantities at a plurality of times of a moving entity to which a certain moving entity ID is assigned are preserved in association with time information, which represents times at which the various state quantities are respectively detected, and sample IDs.

What is referred to as a sample ID is an ID with which a result of estimation performed on a state quantity of a moving entity is discriminated from a result of estimation at any other time point. Data in which a state quantity of a certain moving entity is arrayed time-sequentially as a data string may be called result-of-estimation history data. The result-of-estimation history data is equivalent to a second time-sequential data string. A storage area, in which the result-of-estimation history data is stored, out of storage areas in the in-server memory 24 is equivalent to a second state quantity history storage portion or a second state quantity history memory.

The in-server communicator 25 is connected onto a wide-area network, and transmits or receives data to or from the portable terminal 1. More particularly, the in-server communicator 25 modulates data inputted from a functional block (for example, association identifier 27) included in the server 2, and transmits the resultant data to the predetermined portable terminal 1. The in-server communicator 25 demodulates a signal received over the wide-area network so as to acquire data carried by the receiving signal. For example, when receiving terminal behavior data sent from the portable terminal 1, the in-server communicator 25 associates the terminal behavior data with a terminal ID, which indicates the transmission source of the data, and feeds the terminal behavior data to the communicational party manager 26 and association identifier 27. The in-server communicator 25 is equivalent to an in-second-terminal communication portion or an in-second-terminal communicator.

Not only the portable terminal 1 but also an onboard terminal may be a communicational party of the server 2. Even when data sent from the onboard terminal is received, the data may be processed in the same manner as when the data sent from the portable terminal 1 is received.

The communicational party manager 26 acquires terminal behavior data, which is fed from the in-server communicator 25, together with a terminal ID that indicates the transmission source of the data, and preserves the terminal behavior data in the in-server memory 24 in association with the terminal ID.

The association identifier 27 identifies association of the portable terminal 1 (or onboard terminal), which has transmitted terminal behavior data, with a moving entity, which is detected by the moving entity detection block 221, based on the terminal behavior data fed from the in-server communicator 25 and result-of-estimation history data of each of detected moving entities stored in the in-server memory 24. Hereinafter, the portable terminal 1 equivalent to the transmission source of the terminal behavior data may be referred to as a target-of-identification terminal. The action of the association identifier 27 will be described in conjunction with FIG. 6.

To begin with, a behavior history of a moving entity associated with a target-of-identification terminal is estimated based on various state quantities contained in terminal behavior data. Herein, a moving trajectory will be adopted as the behavior history. A moving trajectory Tra of a target-of-identification terminal is, as in the upper part of FIG. 6, identified based on accelerations in respective axial directions, rotational/angular velocities, and azimuth information which are specified in the terminal behavior data. The moving trajectory Tra may be formed by accumulating a series of change quantities in positions, the change quantity being observed at a microscopic unit time using a result of detection at a certain time and a result of detection at the next time which are contained in the behavior history data.

Figure 6:
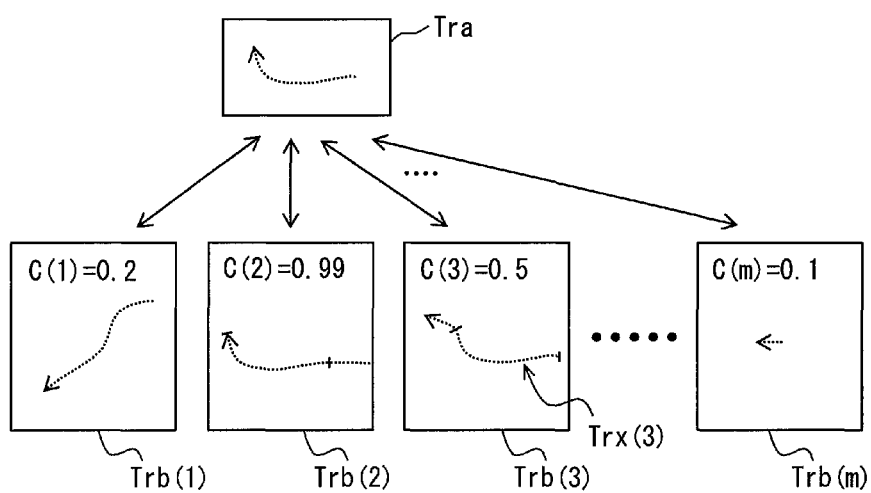
FIG. 6 is a conceptual diagram for explaining an action of an association identifier.

The association identifier 27 acquires a moving trajectory Trb of each of detected moving entities based on a history of an absolute position specified in result-of-estimation history data of each of the detected moving entities. The history data may be also referred to as a time-sequential data string. In FIG. 6, Trb(1), Trb(2), Trb(3), etc., and Trb(m) denote moving trajectories of moving entities whose moving entity IDs are 1, 2, 3, etc., and m. The moving trajectory Trb is equivalent to an example of a second behavior history.

Next, the moving trajectory of a target-of-identification terminal is compared with the moving trajectory of each of detected moving entities, calculating a degree of consistency C between the two moving trajectories. The calculation method of the degree of consistency C may adopt a known pattern matching method. A detected moving entity with which the highest degree of consistency C is obtained is determined to be a moving entity associated with the target-of-identification terminal as an identified moving entity. The terminal ID of the target-of-identification terminal and a moving entity ID assigned to the detected moving entity are linked to be associated.

For example, in the example in FIG. 6, since the trajectory Trb(2) exhibits the highest degree of consistency, a moving entity having a moving entity ID of 2 is associated with the target-of-identification terminal. In FIG. 6, C(1), C(2), C(3), etc., and C(m) denote degrees of consistency C of the trajectory Tra with the trajectories Trb(1), Trb(2), Trb(3), etc., and Trb(m) respectively.

For calculation of the degree of consistency C, a portion of a trajectory of each of detected moving entities that is compared with the trajectory Tra is a portion corresponding to a period from a sample acquisition time coincident with an initial point of the trajectory Tra to a sample acquisition time coincident with the terminal of the trajectory Tra. Therefore, although the trajectory Trb(3) has a portion Trx(3) whose degree of consistency C with the trajectory Tra is on a level with that of the trajectory Trb(2), a moving entity whose moving entity ID is 3 is not determined to be a moving entity associated with the target-of-identification terminal.

The association identifier 27 associates, as mentioned above, a target-of-identification terminal with a detected moving entity, and then collaborates with the in-server communicator 25 to transmit position information, which represents a current absolute position of the detected moving entity, to the portable terminal 1 that is the target-of-identification terminal.

<Overview of First Embodiment>

In the foregoing configuration, the server 2 compares a moving trajectory, which is determined using terminal behavior data sent from the portable terminal 1, with a moving trajectory determined using a result-of-estimation history of each of detected moving entities, and thus associates one of the detected moving entities (i.e., the identified moving entity), which carries the portable terminal 1, with the terminal ID of the portable terminal 1.

For associating a detected moving entity with the portable terminal 1, terminal behavior data sent from the portable terminal 1 merely need be received by the server 2. A posture of a user who carries the portable terminal 1 hardly affects the association. Therefore, compared with the configuration described in Patent Literature 1, a possibility that a detected moving entity cannot be associated with the portable terminal 1 because of the posture of the moving entity can be minimized.

According to the foregoing embodiment, the portable terminal 1 can acquire information, which represents an accurate position of an own terminal (i.e., the portable terminal 1 itself), from the server 2. In general, a result of positioning performed by receiving radio waves from positioning satellites has an error of about several meters because of an adverse effect of multipath propagation. If a moving entity is a pedestrian, the error of several meters makes it uncertain to determine whether the pedestrian is walking along a sidewalk.

According to the configuration of the present embodiment, since the position of the portable terminal 1 is estimated based on an actual photographic image, the position of the portable terminal 1 can be more highly precisely identified than it is identified using a result of positioning performed based on radio waves received from positioning satellites. Accordingly, the portable terminal can more highly precisely determine whether a user who carries the portable terminal 1 itself exists on a sidewalk, and can apply the result of the decision to various services. For example, the services include a service of warning a user, who carries the portable terminal 1 and is walking along a roadway, against presence of a vehicle that is approaching from behind the user.

If a moving entity carrying the portable terminal 1 is a pedestrian or lightweight vehicle, the server 2 may preferably transmit information, which signifies whether the moving entity is moving along a sidewalk or roadway, to the portable terminal 1. Whether the moving entity is a pedestrian is determined using a known image recognition technology when the moving entity detection block 221 extracts the moving entity from image data. Whether the pedestrian who is the moving entity is walking along a sidewalk may be determined by employing the known image recognition technology.

According to the above configuration, even if the portable terminal 1 does not have detailed map data representing a border between a sidewalk area and a roadway area, the portable terminal 1 can determine whether a moving entity associated with the portable terminal 1 itself exists on a sidewalk or roadway.

According to the foregoing configuration, whether a moving entity associated with the portable terminal 1 exists on a sidewalk is determined based on an actual photographic image. Therefore, precision in making the decision can be more upgraded than when the decision is made using position information.

[First Modification]

A description has been made of a mode in which the kind of state quantities contained in terminal behavior data is different from a kind of state quantity estimated by the state quantity estimation block 222. The present invention is not limited to this mode. The kind of state quantities contained in the terminal behavior data and the kind of state quantity estimated by the state quantity estimation block 222 may be identical to each other (i.e., be an identical-kind state quantity); thus, the state quantity contained in the terminal behavior data and the state quantity estimated by the state quantity estimation block 222 may be directly compared with each other.

For example, terminal behavior data may be data representing a moving trajectory attained during a certain period of time since a current time. In this case, the terminal behavior data can be compared with result-of-estimation history data of each of detected moving entities.

The terminal behavior data in this mode is data in which a change quantity in the position of the portable terminal 1 per microscopic unit time is arrayed time-sequentially. The microscopic unit time may be, for example, 100 ms or a value dependent on a time at intervals of which various sensors output results of detections.

The terminal behavior data may be data representing a temporal change in a change quantity in the orientation of the portable terminal 1 on a horizontal plane, and the result-of-estimation history data may be data representing the temporal change in the orientation of a detected moving entity on a plane, which is parallel to a road surface, per unit time. If the road surface is substantially horizontal, a target-of-identification terminal and detected moving entity can be associated with each other by directly comparing the terminal behavior data with the result-of-estimation history data.

[Second Modification]

In the first embodiment, a target-of-identification terminal and detected moving entity are associated with each other based on a degree of consistency C between moving trajectories. The present invention is not limited to this mode. As another mode, a behavior history to be used as a criterial material for association may be a history of a magnitude of an acceleration reacting on a moving entity or a history of a moving velocity of the moving entity. Otherwise, a history of a change in the orientation of the portable terminal 1 will do. A history representing a temporal change in any other physical state quantity will do.

[Third Modification]

In the first embodiment, information to be fed from the server 2 to the portable terminal 1 is not limited to an absolute position (latitude and longitude) or information signifying whether a moving entity exists on a sidewalk. Information concerning a behavior of a moving entity, for example, an azimuth in which the moving entity is oriented, a moving velocity, or a moving trajectory may be transmitted. Information concerning a moving entity existent in the vicinity of the portable terminal 1 may be transmitted.

[Fourth Modification]

The portable terminal 1 (or onboard terminal) and service 2 may communicate with each other via a communication facility (so-called a roadside unit) that is disposed on a roadside or above a road and needed to implement known road-to-vehicle communication. The roadside unit to be employed in road-to-vehicle communication is a communication facility that implements communication, which does not involve a wide-area communication network (that is, road-to-vehicle communication), using radio waves falling within a predefined frequency band, for example, a band of 700 MHz or 5.8 GHz, and thus communicates with a communication terminal which exists within a predetermined range defined with a position, at which the roadside unit is disposed, as a reference.

According to the foregoing mode, the portable terminal 1 can transmit terminal behavior data to the server 2 via the roadside unit, and the server 2 can provide a variety of information, which depends on a moving entity associated with the portable terminal 1, via the roadside unit.

In the foregoing mode, the imaging range 31 should preferably substantially square with a range within which the roadside unit can achieve road-to-vehicle communication. The roadside unit and server 2 is assumed to be connected to each other so that they can communicate with each other.

Second Embodiment

The schematic configuration of an entity recognition system 100 of a second embodiment is identical to that of the first embodiment. The entity recognition system 100 includes a portable terminal 1 that is carried by a user and a server 2 that acquires a photographic signal of a camera 3.

A major difference between the first embodiment and second embodiment lies in a point that the server 2 determines based on a positional relationship and behavior of a detected moving entity whether the moving entity has entered a predetermined situation (warning needed situation), and transmits a warning instruction signal to the portable terminal 1, which is associated with the moving entity, in case the moving entity has entered the warning needed situation.

What is referred to as the warning needed situation is a situation in which a user corresponding to the moving entity should be alerted, for example, a situation in which a possibility that the moving entity may come into contact with another detected moving entity is equal to or larger than a predetermined threshold. What is referred to as the warning instruction signal is a signal with which warning processing (radiating a warning sound or the like) is performed to alert the user of the portable terminal 1. The configurations of the portable terminal 1 and server 2 in the second embodiment will be described below.

Figure 7:
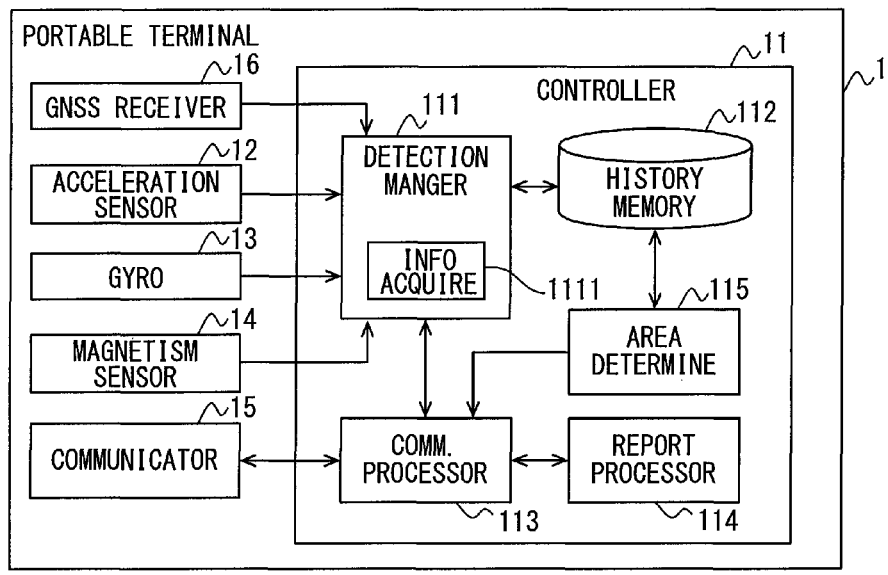
FIG. 7 is a block diagram illustrating an example of a schematic configuration of a portable terminal in a second embodiment.

As in FIG. 7, the portable terminal 1 in the second embodiment includes, in addition to the features or functions mentioned in relation to the first embodiment, a GNSS receiver 16 and area inside/outside determination portion 115. A detection manager 111 includes a position information acquisition block 1111.

The GNSS receiver 16 acquires information representing the current position of the portable terminal 1 by receiving radio waves from satellites (GNSS satellites) employed in a global navigation satellite system (GNSS). The current position acquired by the GNSS receiver 16 may be expressed with, for example, a latitude and longitude. The position information acquired by the GNSS receiver 16 is sequentially (for example, at intervals of 100 ms) fed to an in-portable controller 11.

The position information acquisition block 1111 included in the detection manager 111 is a functional block that acquires position information fed from the GNSS receiver 16. The detection manager 111 preserves the position information, which is acquired by the position information acquisition block 1111, in the history memory 112 in association with time information.

The area inside/outside determination portion 115, which may be also referred to as an area inside and outside determiner, determines whether the portable terminal 1 that is an own terminal exists within the imaging range 31 (or on a borderline). The area inside/outside determination portion 115 compares a current position, which is fed from the GNSS receiver 16, with data (area data), which expresses an area defined as the imaging range 31, so as to determine whether the portable terminal exists within the imaging range 31.

More particularly, if the current position of the own terminal falls within the area represented by area data (or on the borderline), the area inside/outside determination portion 115 determines that the portable terminal 1 exists within the imaging range 31. If the current position falls outside the area expressed with the area data, the area inside/outside determination portion 115 determines that the portable terminal 1 does not exist within the imaging range 31. The area data may represent a latitude and longitude and may be preliminarily stored in a nonvolatile storage medium included in an in-portable controller 11. The latest outcome received by the GNSS receiver 16 may be acquired by accessing the history memory 112.

When determining that the portable terminal 1 exists within the imaging range 31, the area inside/outside determination portion 115 notifies an in-portable communication processor 113 of the fact. When the area inside/outside determination portion 115 determines that the portable terminal exists within the imaging range 31, the in-portable communication processor 113 transmits terminal behavior data at regular intervals.

In the present embodiment, area data is prepared. The area inside/outside determination portion 115 compares a current position, which is received by the GNSS receiver 16, with the area data so as to determine whether the portable terminal 1 exists within the imaging range 31. The present invention is not limited to this mode. For example, as mentioned in relation to the fourth modification, when the portable terminal 1 and server 2 communicate with each other via a roadside unit, a decision may be made based on the fact that a signal sent from the roadside unit is being received that the portable terminal 1 exists within the imaging range 31. In this mode, the portable terminal 1 need not include the GNSS receiver 16.

Figure 8:
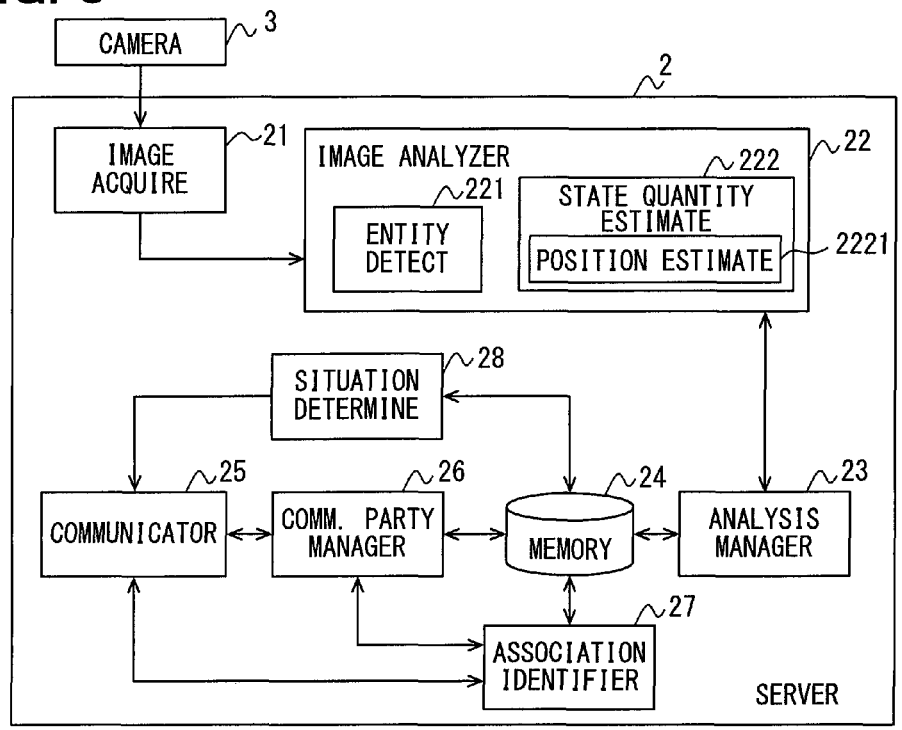
FIG. 8 is a block diagram illustrating an example of a schematic configuration of a server in the second embodiment.

As in FIG. 8, the server 2 in the second embodiment includes, in addition to the features mentioned in relation to the first embodiment, a situation determination portion 28.

The situation determination portion 28, which may be also referred to as a situation determiner, determines based on result-of-estimation history data of each of detected moving entities whether each of the detected moving entities has entered a predefined warning needed situation. More particularly, a possibility that a first moving entity and second moving entity may collide with each other is computed based on the position, moving velocity, and moving direction of a certain detected moving entity (first moving entity) and the position, moving velocity, and moving direction of another detected moving entity (second moving entity). If the possibility that the moving entities may collide with each other is equal to or larger than a predetermined threshold, a decision is made that the first moving entity and second moving entity have entered the warning needed situation.

When the possibility that the first moving entity and second moving entity may collide with each other is equal to or larger than the predetermined threshold, the situation determination portion 28 calculates a time remaining until the collision occurs (time to collision (TTC)). If the TTC is equal to or smaller than a predetermined threshold, a decision may be made that the moving entities have entered the warning needed situation.

A method of computing a possibility of collision based on the positions, moving velocities, and moving directions of the first and second moving entities, and a method of calculating the TTC are already known. An iterative description will be omitted. The situation determination portion 28 makes a decision on each combination of two detected moving entities.

The situation determination portion 28 requests an in-server communicator 25 to transmit a warning instruction signal to detected moving entities that are determined to have entered a warning needed situation. In response to the request sent from the situation determination portion 28, the in-server communicator 25 transmits the warning instruction signal to the portable terminals 1 (or onboard terminals) which are associated with the respective detected moving entities that are determined to have entered the warning needed situation by the situation determination portion 28.

In the portable terminal 1, when the in-portable communication processor 113 acquires the warning instruction signal, a reporting processor 114 outputs a warning sound or a speech message, which alerts a user, through a loudspeaker, or causes a vibrator to vibrate so as to report the user the fact that the warning needed situation is established. The processing sequence of reporting the user the fact that the warning needed situation is established is equivalent to the warning processing. As the warning processing, the reporting processor 114 may display an image or text, which signifies that the warning needed situation is established, for the user. The reporting processor 114 is equivalent to an example of a warning processor or a warning processing portion.

<Overview of Second Embodiment>

In the second embodiment, similarly to the first embodiment, association of a moving entity existent within the imaging range 31 with the portable terminal 1 is sequentially identified. The server 2 monitors the situation of moving entities existent within the imaging range 31. If a subject moving entity that is any one of the moving entities that has entered a warning needed situation is found, the server 2 transmits a warning instruction signal to the portable terminals 1 associated with the subject moving entity. The portable terminal 1 having received the warning instruction signal reports a user the fact that the warning needed situation is established. According to this mode, various moving entities can more safely pass through the imaging range 31.

In the cited mode, a situation in which moving entities may collide with each other (collision predictive situation) is adopted as the warning needed situation. The present invention is not limited to the mode. A situation in which a detected moving entity that is classified into a vehicle as a type of moving entity is operated in a predetermined driving manner such as abrupt acceleration, abrupt deceleration, abrupt turning of a steering wheel, stoplight ignorance, and halt ignorance may be adopted as the warning needed situation.

Third Embodiment

A schematic configuration of an entity recognition system 100 of a third embodiment is identical to those of the first and second embodiments. The entity recognition system 100 includes a portable terminal 1 that is carried by a user, and a server 2 that acquires a photographic signal of a camera 3. A major difference of the present embodiment from the aforesaid embodiments lies in a point that the server 2 accommodates a plurality of cameras 3 that image mutually different ranges. The configurations of the portable terminal 1 and server 2 in the third embodiment will be described below.

The portable terminal 1 in the present embodiment includes, similarly to the portable terminal 1 in the second embodiment, a GNSS receiver 16, and can therefor acquire the current position (latitude and longitude) of the own terminal. An in-portable communication processor 113 transmits terminal behavior data, which contains position information representing the current position, to the server 2.

Figure 9:
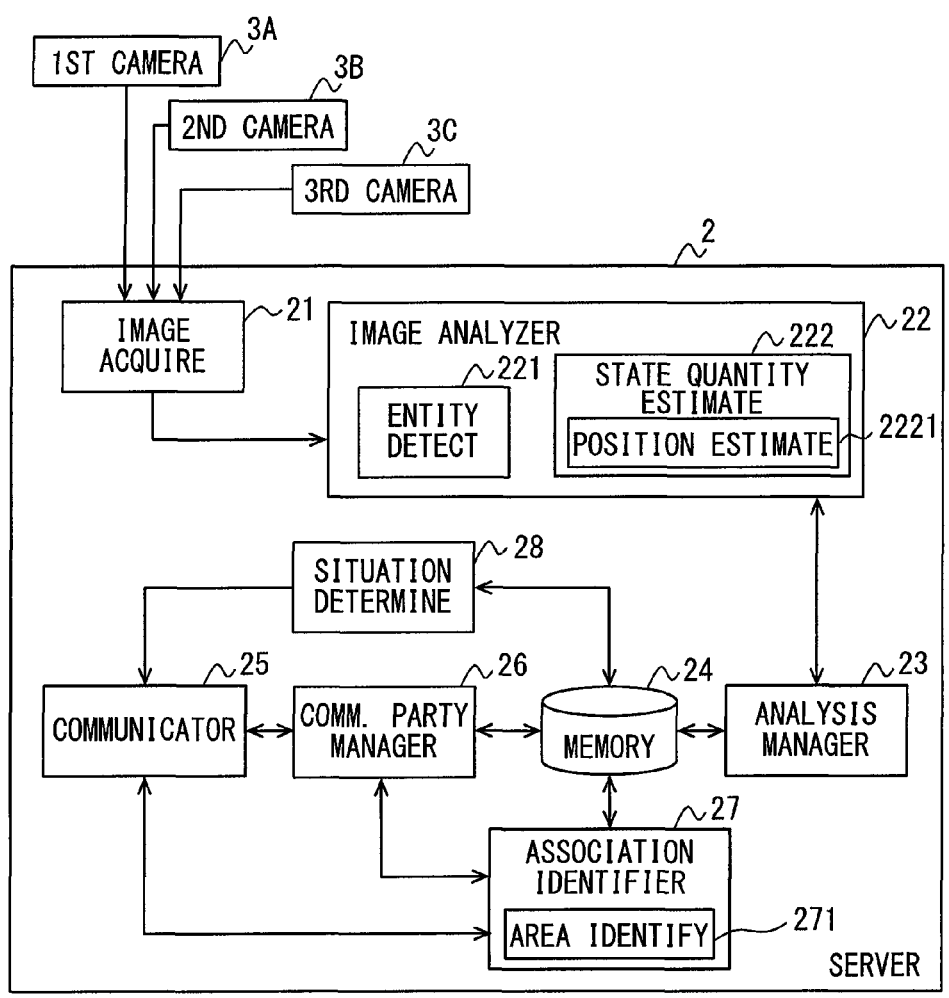
FIG. 9 is a block diagram illustrating an example of a schematic configuration of a server in a third embodiment.

The server 2 in the present embodiment is, as in FIG. 9, connected to a first camera 3A, second camera 3B, and third camera 3C that are the cameras 3 and that define mutually different ranges as imaging ranges. Herein, the server 2 is connected to the three cameras. The number of cameras to be connected to the server 2 is not limited to three but may be two or four or more. Camera IDs that are identifiers with which the cameras are discriminated from one another are assigned to the cameras 3.

For convenience' sake, when the imaging ranges 31 of the first camera 3A, second camera 3B, and third camera 3C are discriminated from one another, 31A, 31B, and 31C are assigned to denote the respective imaging ranges 31. Data items representing areas that are the imaging ranges 31 of the respective cameras (that is, area data items) are stored in an in-server memory 24.

An image acquisition portion 21 sequentially acquires image data items that are carried by video signals produced by the respective cameras 3, and feeds the image data items (i.e., image data string) to an image analyzer 22 by sorting the image data items into the cameras 3 that are provision sources of the video signals carrying the image data items. The image analyzer 22 performs image analysis processing on image data stemming from each of the cameras 3, and detects a moving entity or estimates various state quantities in relation to each of the imaging ranges 31. For example, a moving entity existent in the imaging range 31A is detected based on image data stemming from the first camera 3A, and state quantities of the moving entity are estimated.

An analysis manager 23 manages information on moving entities in the imaging ranges 31 by sorting the information into the imaging ranges 31. For example, a moving entity detected based on image data stemming from the first camera 3A is preserved in association with the imaging range 31A of the first camera 3A. The moving entity detected based on the image data stemming from the first camera 3A is a moving entity existent within the imaging range 31A of the first camera 3A. Likewise, moving entities detected based on image data items stemming from the second camera 3B and third camera 3C respectively are preserved in association with the imaging ranges 31B and 31C respectively within which the respective moving entities exist.

An association identifier 27 in the present embodiment includes an area identification block 271 that identifies the imaging range 31, in which a target-of-identification terminal exists, from among the imaging ranges 31A to 31C based on position information contained in terminal behavior data. The area identification block 271 compares position information, which is contained in terminal behavior data, with area data defining each of the imaging ranges 31A to 31C, and thus identifies the imaging range 31 in which the target-of-identification terminal exists. The area identification block 271 is equivalent to an area identification block, an area identification portion, or an area identifier, and the imaging range 31 in which the target-of-identification terminal exists (a stay imaging range) is equivalent to a terminal stay area.

The association identifier 27 compares a behavior history of each of detected moving entities, which exist in the stay imaging range 31, with a behavior history determined with terminal behavior data, and identifies a detected moving entity corresponding to the target-of-identification terminal.

Processing to be performed after the stay imaging range 31 is identified is identical to that in the aforesaid embodiments or modifications. For example, position information representing a more accurate current position is transmitted to the target-of-identification terminal. If a moving entity having entered a warning needed situation is found, a warning instruction signal may be transmitted to the portable terminal associated with the moving entity. The imaging ranges 31 of the cameras 3 may partly overlap.

Fourth Embodiment

An entity recognition system 100 of a fourth embodiment includes an onboard terminal 4 that is mounted in a vehicle having an onboard camera which images a predetermined range outside the vehicle, in addition to (i) a portable terminal 1 that is carried by a user, and (ii) a server 2 that acquires a photographic signal of a camera 3. The vehicle in which the onboard terminal 4 is mounted may be referred to as a host vehicle (or subject vehicle); the host vehicle may be equivalent to a moving entity employing the onboard terminal 4.

The onboard terminal 4 in the present embodiment has the same features as the portable terminal 1 does. While detecting various state quantities which indicate a behavior of the host vehicle, the onboard terminal 4 transmits terminal behavior data, which is a time-sequential data string representing results of detections, to the server 2. The onboard terminal 4 includes a feature or function that transmits a photographic image, which is produced by the onboard camera, to the server 2.

Figure 10:
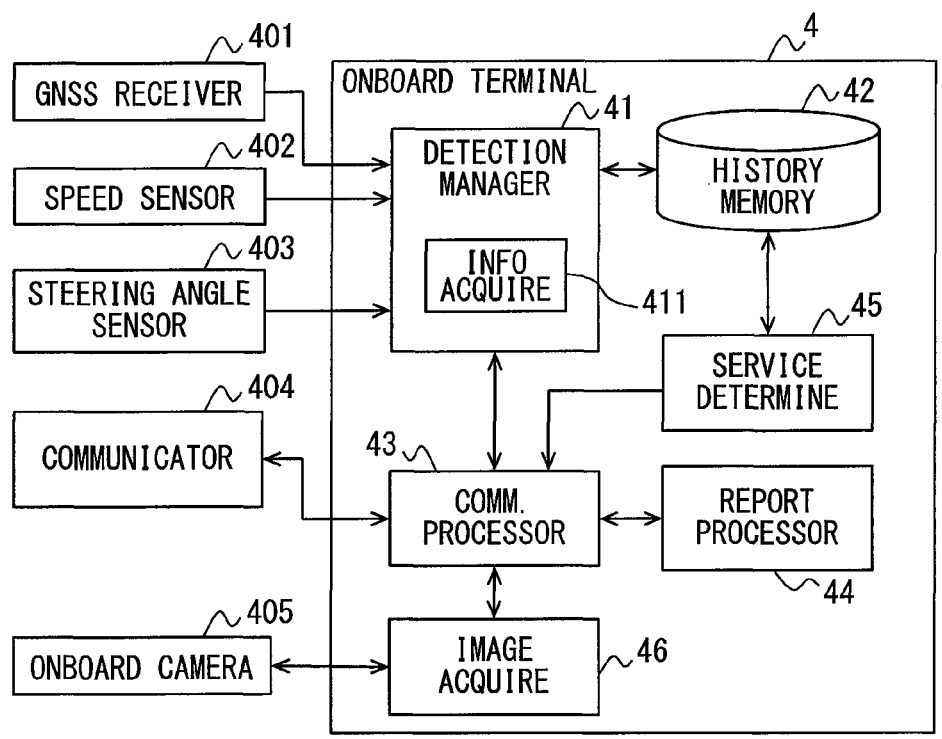
FIG. 10 is a block diagram illustrating an example of a schematic configuration of an onboard terminal in a fourth embodiment.

FIG. 10 illustrates a schematic configuration of the onboard terminal 4. The onboard terminal 4 is, as in FIG. 10, connected to each of a GNSS receiver 401, vehicle speed sensor 402, steering angle sensor 403, in-vehicle communicator 404, and onboard camera 405.

The GNSS receiver 401 is identical to the GNSS receiver 16 included in the portable terminal 1. The vehicle speed sensor 402 detects a traveling speed of a vehicle, and the steering angle sensor 403 detects a steering angle applied to the driving wheels of the vehicle. The results of detections by the GNSS receiver 401, vehicle speed sensor 402, and steering angle sensor 403 respectively are sequentially fed to the onboard terminal 4. The in-vehicle communicator 404 is, similarly to an in-portable communicator 15, a communication unit that transmits or receives data to or from the server 2, and is connected to the onboard terminal 4 so that the in-vehicle communicator 404 can communicate with the onboard terminal 4. The in-vehicle communicator 404 may be incorporated in the onboard terminal 4.

The onboard camera 405 is a camera that images a predetermined range outside a vehicle. Herein, the onboard camera 405 is a forward-looking camera that images a predetermined range (forward imaging range) in front of the vehicle. The forward-looking camera serving as the onboard camera 405 may be, for example, attached to a position near the upper end of a windshield in a posture enabling imaging of the forward imaging range. A video signal produced by the onboard camera 405 is sequentially fed to the onboard terminal 4. The onboard camera 405 is equivalent to an example of an entity detection apparatus, and the video signal is equivalent to external environment data.

Position-of-disposition data representing a position at which the onboard camera 405 is disposed, and forward imaging range data representing an area regarded as a forward imaging range with respect to a predefined reference point on the host vehicle are stored in a storage included in the onboard terminal 4. The reference point on the host vehicle may be appropriately designed, and may be a position to be adopted as the current position of the host vehicle or the center of the host vehicle.

The onboard terminal 4 is configured as an ordinary computer and includes a CPU, memory, storage, I/O port, and a bus over which these components are interconnected. The storage stores software such as the aforesaid application program and a terminal ID.

The onboard terminal 4 includes, as functional blocks that are realized by running software stored in the storage, a detection manager 41, history memory 42, in-vehicle communication processor 43, reporting processor 44, service determination portion 45, and in-vehicle image acquisition portion 46.

Each of the detection manager 41, in-vehicle communication processor 43, reporting processor 44, service determination portion 45, and in-vehicle image acquisition portion 46 may be realized by hardware with at least one IC. The history memory 42 may be realized by utilizing part of a memory included in the onboard terminal 4.

The detection manager 41, history memory 42, in-vehicle communication processor 43, and reporting processor 44 included in the onboard terminal 4 have the same capabilities as the members included in the portable terminal 1 and assigned the same names. Therefore, an iterative description will be omitted. The detection manager 41 includes a position information acquisition block 411 that acquires position information on the host vehicle fed from the GNSS receiver 40. The position information acquisition block 411 may identify the current position of the host vehicle based on a result of detection by the vehicle speed sensor 402 and a result of detection by the steering angle sensor 403 by employing a known dead reckoning technology.

The service determination portion 45, which may be also referred to as a service determiner, determines based on results of detections by the GNSS receiver 401, vehicle speed sensor 402, and steering angle sensor 403 whether the host vehicle exists in a predefined service provision area. The service provision area is, as described later, an area in which image data carried by a video signal produced by the onboard camera 405 is fed to the server 2, and may be designed by a managing person of the server 2. The service provision area may be, similarly to area data that represents the imaging range 31, defined with a latitude and longitude, and data representing an area regarded as the service provision area may be stored in the storage included in the onboard terminal 4.

The in-vehicle image acquisition portion 46 acquires a video signal produced by the onboard camera 405, converts the video signal into predetermined image data, and feeds the image data to the in-vehicle communication processor 43. The in-vehicle image acquisition portion 46 is equivalent to an external environment data acquisition portion or an external environment data acquirer. The in-vehicle image acquisition portion 46 identifies a range, which is imaged by the onboard camera 405 (equivalent to a vehicular detection area), based on position information representing the current position of the portable terminal 1 and forward imaging range data, and feeds the information, which represents the range, as imaging range information to the in-vehicle communication processor 43. The imaging range information is equivalent to vehicular detection area data.

If the service determination portion 45 determines that the host vehicle exists in the service provision area, the in-vehicle communication processor 43 transmits vehicle image data, which is obtained by appending imaging range information, which represents an imaging range, to image data fed from the in-vehicle image acquisition portion 46, to the server 2.

The server 2 in the present embodiment acquires vehicle image data from the onboard terminal 4, and then identifies the imaging range of the onboard camera 405, which is included in the onboard terminal 4, based on imaging range information contained in the vehicle image data. The image analyzer 22 performs image analysis processing on image data contained in the vehicle image data, whereby a moving entity is detected. The position of the detected moving entity is estimated based on the position and size of the detected moving entity in the image data, and the identified imaging range.

The position estimated by the image analyzer 22 may be an absolute position indicated with a latitude and longitude, or a relative position with respect to a current position of a vehicle that has fed the image data. For brevity's sake, a state quantity of a detected moving entity which is estimated based on an image fed from the onboard terminal 4 is position information. However, the present invention is not limited to the position information. A moving velocity or moving direction may be estimated. A result of analysis by the image analyzer 22 is preserved in association with a detected ID in the in-server memory 24 by the analysis manager 23.

The association identifier 27 compares a behavior history, which is determined with terminal behavior data sent from the portable terminal 1 or onboard terminal 4, with a behavior history determined with result-of-estimation history data of each of detected moving entities, and then identifies association.

A situation determination portion 28 regards detected moving entities, which are extracted from image data produced by the camera 3 connected to the server 2, and detected moving entities, which are extracted from image data produced by the onboard camera 405, as a population, and determines whether a moving entity that has entered a warning needed situation is found. If a subject moving entity that is any one of the moving entities that has entered the warning needed situation is found, the situation determination portion 28 transmits a warning instruction signal to each of communication terminals (portable terminals 1 and onboard terminals 4) associated with the subject moving entity and all the moving entities relating to the subject moving entity. The subject moving entity may be also referred to as an identified moving entity.

According to the foregoing mode, the server 2 uses a picture, which is produced by the onboard camera 405 that is dynamically added along with entry in a service provision area, in addition to a picture produced by the camera 3, which is connected to the server 2 and has its position of deposition fixed, to monitor whether a moving entity that has entered a warning needed situation exists in the service provision area. If the moving entity that has entered the warning needed situation is found, a warning instruction signal is transmitted to communication terminals associated with all moving entities relating to the moving entity. Thus, the moving entities can more safely move through the service provision area.

Fifth Embodiment

An entity recognition system 100 in accordance with a fifth embodiment includes a portable terminal 1 and server 2. A major difference from the aforesaid embodiments lies in a point that the portable terminal 1 does not transmit terminal behavior data to the server 2 and the server 2 need not include an association identifier 27. The configurations of the portable terminal 1 and server 2 in the fifth embodiment will be described below.

Figure 11:
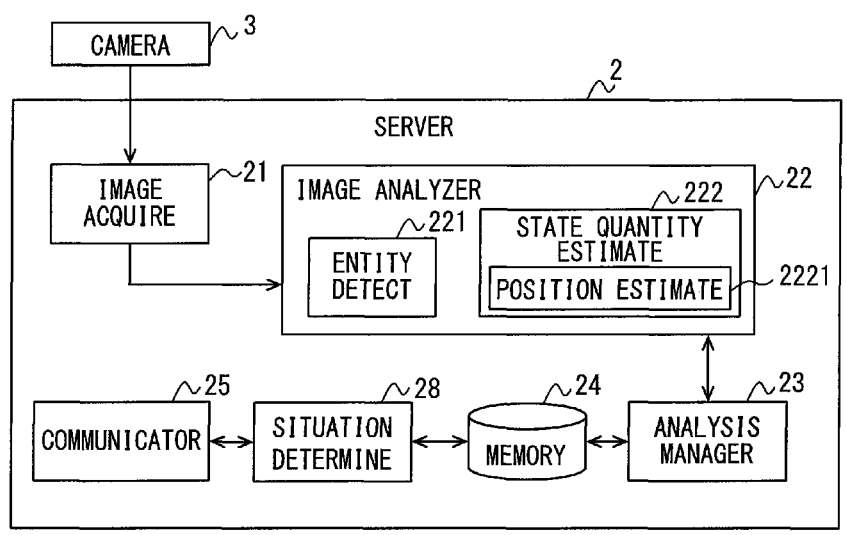
FIG. 11 is a block diagram illustrating an example of a schematic configuration of a server in a fifth embodiment.

The server 2 in the present embodiment includes, as in FIG. 11, an image acquisition portion 21, image analyzer 22, analysis manager 23, in-server memory 24, in-server communicator 25, and situation determination portion 28. The image acquisition portion 21, image analyzer 22, analysis manager 23, in-server memory 24, and in-server communicator 25 are identical to those described previously.

The situation determination portion 28 in the present embodiment determines based on result-of-estimation history data of each of detected moving entities whether each of the detected moving entities has entered a predefined warning needed situation. A method of determining whether a subject moving entity that is any one of detected moving entities has entered the warning needed situation is identical to the method described in relation to the second embodiment.

If the subject moving entity that is determined to have entered the warning needed situation is found, the situation determination portion 28 acquires result-of-estimation history data of the subject moving entity, which has entered the warning needed situation, over a certain period of time since a current time, as target-of-warning behavior data. The target-of-warning behavior data is, namely, data representing a history of a behavior of a moving entity that should be alerted. The situation determination portion 28 feeds the target-of-warning behavior data to the in-server communicator 25, and allows the in-server communicator 25 to transmit the data to the portable terminal(s) 1 included in the entity recognition system 100.

The portable terminal 1 that is a target of transmission of target-of-warning behavior data may include all the portable terminals 1 accommodated by the server 2. However, for a different portable terminal 1 that exists outside the imaging range 31, the target-of-warning behavior data has nothing to do with the different portable terminal 1. Namely, a portable terminal 1 corresponding to the target or destination of transmission of target-of-warning data is preferably limited to a portable terminal 1 existent within the imaging range 31.

For example, if the portable terminals 1 are designed to transmit the current positions of the own terminals to the server 2, the server 2 determines based on position information, which is sent from each of the portable terminals 1, whether each of the portable terminals 1 exists within the imaging range 31. The server 2 then transmits target-of-warning data to the portable terminal(s) 1 existing within the imaging range 31.

Figure 12:
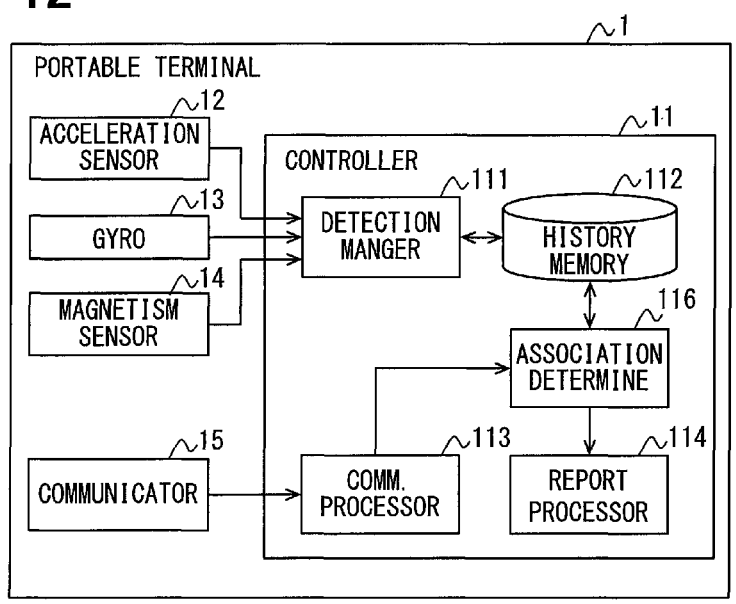
FIG. 12 is a block diagram illustrating an example of a schematic configuration of a portable terminal in the fifth embodiment.

An in-portable controller 11 in the present embodiment includes, as in FIG. 12, an association determination portion 116 in addition to a detection manager 111, history memory 112, in-portable communication processor 113, and reporting processor 114.

The in-portable communication processor 113 in the present embodiment need not transmit terminal behavior data to the server 2. The in-portable communication processor 113 merely need have a capability to acquire target-of-warning behavior data, which is transmitted from the server 2 to be received by an in-portable communicator 15. The in-portable communication processor 113 acquires the target-of-warning behavior data, and in turn feeds the data to the association determination portion 116.

The association determination portion 116, which may be also referred to as an association determiner, included in the in-portable controller 11 acquires target-of-warning behavior data from the in-portable communication processor 113, and then estimates a behavior history (for example, a moving trajectory) of a moving entity, which has entered a warning needed situation, based on the target-of-warning behavior data. The association determination portion 116 estimates the behavior history (herein, the moving trajectory) of the own terminal (i.e., the portable terminal 1 itself) over a time zone, which is identical to the period of time concerned with the target-of-warning behavior data, based on results of detections obtained over the time zone out of results of detections stored in the history memory 112. The moving trajectory of the own terminal is compared with the moving trajectory of the moving entity that has entered the warning needed situation, and a degree of consistency C is calculated.

If the degree of consistency C is equal to or larger than a predetermined threshold, the moving entity that has entered the warning needed situation is determined to be a moving entity which carries the own terminal or in which the own terminal is mounted. The reporting processor 114 is requested to perform warning processing. The reporting processor 114 performs warning processing in response to the request sent from the association determination portion 116. The association determination portion 116 is equivalent to an in-first-terminal association determination portion or an in-first-terminal association determiner.

[Fifth Modification]

As explained above, the server 2 is connected to the camera 3 serving as an entity detection apparatus that detects a moving entity existent in a certain area. The present invention is not limited to the camera. The server 2 may be connected to a known LIDAR (light detection and ranging/laser imaging detection and ranging) apparatus in place of the camera 3. Namely, the server 2 may detect existence of a moving entity in a predetermined area based on output data of the LIDAR apparatus, and may estimate various state quantities of the detected moving entity. The entity recognition system 100 may include a combination of the camera 3 and LIDAR apparatus.

Further, the onboard terminal 4 in the fourth embodiment may acquire a result of detection by a millimeter-wave radar or LIDAR apparatus, which is mounted in a host vehicle, instead of a video signal produced by the onboard camera 405. In this mode, if the service determination portion 45 determines that the host vehicle exists in a service provision area, the onboard terminal 4 feeds a result of detection by the millimeter-wave radar or LIDAR apparatus to the server 2. The result of detection by the millimeter-wave radar or LIDAR apparatus is equivalent to external environment data.

[Sixth Modification]

The features or functions of the server 2 included in any of the first to fourth embodiments may be included in the onboard terminal 4 or portable terminal 1, and the onboard terminal 4 or portable terminal 1 may function as the server 2 (that is, a second terminal). When the portable terminal 1 is designed to function as the server 2, the portable terminal 1 is supposed to include an entity detection apparatus such as a camera.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An entity recognition system comprising:
a first terminal carried by or mounted to a subject moving entity; and
a second terminal separated from the first terminal to wirelessly communicate with the first terminal,
wherein the first terminal includes
a state quantity acquirer that acquires a predetermined first state quantity that varies depending on a behavior of the subject moving entity,
a first state quantity history memory that stores a first time-sequential data string that represents a history of the first state quantity, and
an in-first-terminal communicator that communicates with the second terminal to transmit the first time-sequential data string stored in the first state quantity history memory, to the second terminal,
wherein the second terminal includes
an in-second-terminal communicator that communicates with the first terminal to acquire at least the first time-sequential data string from the first terminal,
a detection data acquirer that acquires detection data used to detect an entity present in a predetermined detection area,
a moving entity detector that detects at least one moving entity that is present in the detection area by analyzing the detection data,
a state quantity estimator that estimates a predetermined second state quantity concerning a behavior of a detected moving entity that is the at least one moving entity detected by the moving entity detector, based on the detection data,
a second state quantity history memory that stores a second time-sequential data string in association with the detected moving entity, the second time-sequential data string representing a history of the second state quantity of the detected moving entity, and
an association identifier identifying an association between (i) the first terminal, which is equivalent to a transmission source of the first time-sequential data string, and (ii) an identified moving entity that is identified from the detected moving entity, to determine that the identified moving entity is associated with the first terminal, based on the first time-sequential data string received by the in-second-terminal communicator and the second time-sequential data string stored in the second state quantity history memory.

2. The entity recognition system according to claim 1, wherein:
each of (i) the first state quantity whose history is represented by the first time-sequential data string and (ii) the second state quantity whose history is represented by the second time-sequential data string each corresponds to an identical-kind state quantity;
the first time-sequential data string and the second time-sequential data string each represent a temporal change in the identical-kind state quantity; and
when the moving entity detector detects a plurality of moving entities as the at least one moving entity, the association identifier
compares a first trajectory with a second trajectory to check consistency,
the first trajectory being of the temporal change in the identical-kind state quantity represented by the first time-sequential data string,
the second trajectory being of the temporal change in the identical-kind state quantity represented by the second time-sequential data string of each of the plurality of moving entities detected by the moving entity detector, and
determines one of the plurality of moving entities associated with the second time-sequential data string which exhibits a highest degree in the consistency, as the identified moving entity associated with the first terminal equivalent to the transmission source of the first time-sequential data string.

3. The entity recognition system according to claim 1, wherein:
the first time-sequential data string is used by the second terminal to estimate a moving trajectory of the first terminal;
the second time-sequential data string represents a moving trajectory of the detected moving entity; and
when the moving entity detector detects a plurality of moving entities as the at least one moving entity, the association identifier
estimates the moving trajectory of the first terminal, which is equivalent to the transmission source of the first time-sequential data string, based on the first time-sequential data string received by the in-second-terminal communicator,
compares the estimated moving trajectory of the first terminal with the moving trajectory of each of the plurality of moving entities detected by the moving entity detector, to check consistency, and
determines one of the plurality of moving entities which provides a highest degree in the consistency, as the identified moving entity associated with the first terminal equivalent to the transmission source of the first time-sequential data string.

4. The entity recognition system according to claim 1, wherein
the in-second-terminal communicator transmits information, which is determined based on the second state quantity, which the state quantity estimator estimates with respect to the identified moving entity, to the first terminal associated with the identified moving entity.

5. The entity recognition system according to claim 4, wherein:
the state quantity estimator includes a position estimator that identifies a position of the detected moving entity based on the detection data; and
the in-second-terminal communicator transmits, to the first terminal, position information, which represents a position, which the position estimator estimates with respect to the identified moving entity associated with the first terminal.

6. The entity recognition system according to claim 1, wherein:
the second terminal includes a situation determiner that determines based on the second state quantity stored in the second state quantity history memory with respect to the detected moving entity, whether the detected moving entity present in the detection area has entered a predefined warning needed situation;
the in-second-terminal communicator transmits a predetermined warning instruction signal to the first terminal associated with the identified moving entity that is determined to have entered the warning needed situation by the situation determiner; and
the first terminal includes a warning processor that, when the in-first-terminal communicator receives the warning instruction signal, warns a user to cause the user to recognize an occurrence of the warning needed situation.

7. The entity recognition system according to claim 6, wherein:
the state quantity estimator estimates, as the second state quantity, each of a position, a moving direction, and a moving velocity of the detected moving entity;
when the moving entity detector detects a plurality of moving entities as the at least one moving entity, the situation determiner determines based on mutual relationship among positions, moving directions, and moving velocities of the plurality of moving entities whether the identified moving entity has entered a collision predictive situation to collide with the plurality of moving entities other than the identified moving object, as the warning needed situation; and
the in-second-terminal communicator transmits the warning instruction signal to the first terminals associated with the identified moving entity that is determined to have entered the collision predictive situation by the situation determiner.

8. The entity recognition system according to claim 1, wherein:
in the first terminal, the state quantity acquirer acquires, as the state quantity, position information representing a current position, while the in-first-terminal communicator transmits the position information to the second terminal;
in the second terminal, the detection data acquirer acquires detection data used to detect an entity present in each of a plurality of predetermined detection areas;
the second terminal further includes an area identifier that, when receiving the position information sent from the first terminal, identifies a terminal stay area, which is a detection area in which the first terminal equivalent to a transmission source of the position information exists, from among the plurality of detection areas based on the position information; and
the association identifier determines the identified moving entity, which is associated with the first terminal, from the detected moving entity that is the at least one moving entity detected by the moving entity detector based on the detection data associated with the terminal stay area.

9. The entity recognition system according to claim 1, wherein:
the first terminal is an onboard terminal mounted to a vehicle;
the vehicle includes an entity detection apparatus that detects an entity present within a predetermined range adjacent to the vehicle and that outputs external environment data containing information on the entity present within the predetermined range;
the first terminal includes an external environment data acquirer that acquires the external environment data, and a service determiner that determines whether the vehicle is present in a predetermined service provision area;
the state quantity acquirer in the first terminal acquires a current position and an orientation of the vehicle;
the external environment data acquirer identifies a vehicular detection area, which is an area regarded as a range within which an entity is detected by the entity detection apparatus of the vehicle, based on the current position and the orientation of the vehicle acquired by the state quantity acquirer;
when the service determiner determines that the vehicle exists in the service provision area, the in-first-terminal communicator associates the external environment data with a vehicular detection area data representing the vehicular detection area, and transmits the external environment data associated with the vehicular detection area to the second terminal;
the second terminal acquires the external environment data associated with the vehicular detection area data from the first terminal;
the moving entity detector detects a moving entity, which exists in the vehicular detection area, based on the external environment data transmitted from the first terminal being the onboard terminal; and
the state quantity acquirer estimates the second state quantity of the moving entity, which is detected by the moving entity detector, based on the external environment data transmitted from the first terminal being the onboard terminal.

10. An entity recognition system comprising:
a plurality of first terminals that are respectively carried by subject moving entities or mounted to the subject moving entities; and
a second terminal separated from the plurality of first terminals that wirelessly communicates with each of the plurality of first terminals,
wherein a subject first terminal that is any one of the plurality of first terminals includes
a state quantity acquirer that acquires a predetermined first state quantity which varies depending on a behavior of the corresponding subject moving entity,
a first state quantity history memory that stores a first time-sequential data string representing a history of the first state quantity, and
an in-first-terminal communicator that communicates with the second terminal, wherein the second terminal includes
an in-second-terminal communicator that communicates with each of the plurality of first terminals,
a detection data acquirer that acquires detection data used to detect an entity present in a predetermined detection area,
a moving entity detector that detects at least one moving entity present in the detection area by analyzing the detection data,
a state quantity estimator that estimates a second state quantity of a detected moving entity that is the at least one moving entity detected by the moving entity detector, based on the detection data acquired by the detection data acquirer,
a second state quantity history memory that stores a second time-sequential data string in association with the detected moving entity, the second time-sequential data string representing a history of the second state quantity of the detected moving entity, and
a situation determiner that determines based on the second state quantity of the detected moving entity stored in the second state quantity history memory, whether an identified moving entity that is included in the detected moving entity present in the detection area has entered a predefined warning needed situation,
wherein the in-second-terminal communicator transmits the second time-sequential data string to the plurality of first terminals, the second time-sequential data string being associated with the identified moving entity that is determined to have entered the warning needed situation by the situation determiner, whereas the in-first-terminal communicator of each of the plurality of first terminals receives the second time-sequential data string from the second terminal, and
wherein the subject first terminal that is any one of the plurality of first terminals further includes
an in-first-terminal association determiner that compares the second time-sequential data string received by the in-first-terminal communicator, with the first time-sequential data string stored in the first state quantity history memory to determine whether the identified moving entity associated with the received second time-sequential data string is the corresponding subject moving entity which carries the subject first terminal or to which the subject first terminal is mounted, and
a warning processor that warns a user when the in-first-terminal association determiner determines that the identified moving entity associated with the received second time-sequential data string is the corresponding subject moving entity which carries the subject first terminal or to which the subject first terminal is mounted.

* * * * *